July 1, 1941.  E. V. GARNETT ET AL  2,247,487
DUAL FRONT WHEEL MOUNTING
Filed Jan. 15, 1940  2 Sheets-Sheet 2
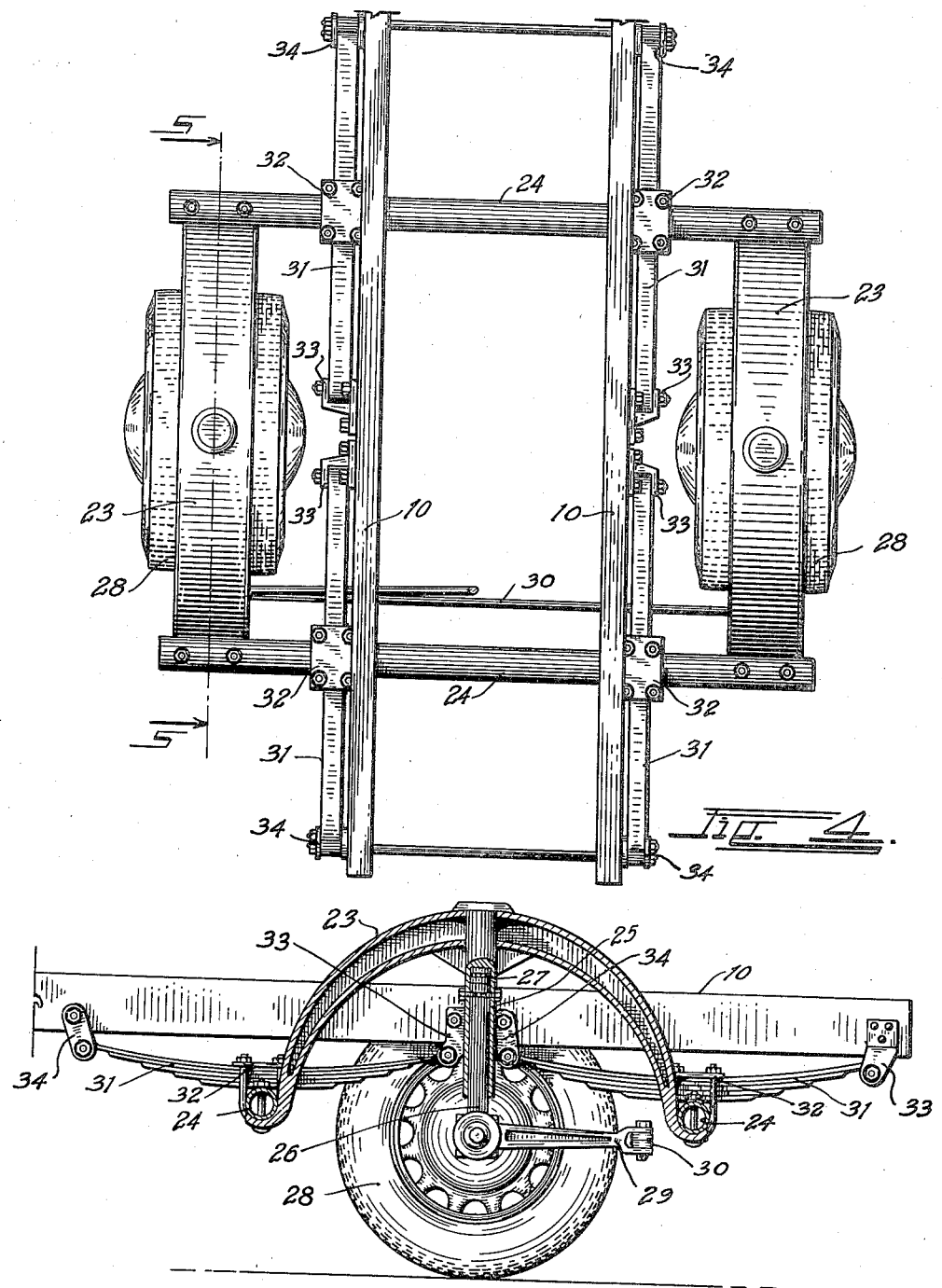
INVENTORS.
VACTOR G. GARNETT
EDWARD V. GARNETT
BY
ATTORNEY Patented July 1, 1941

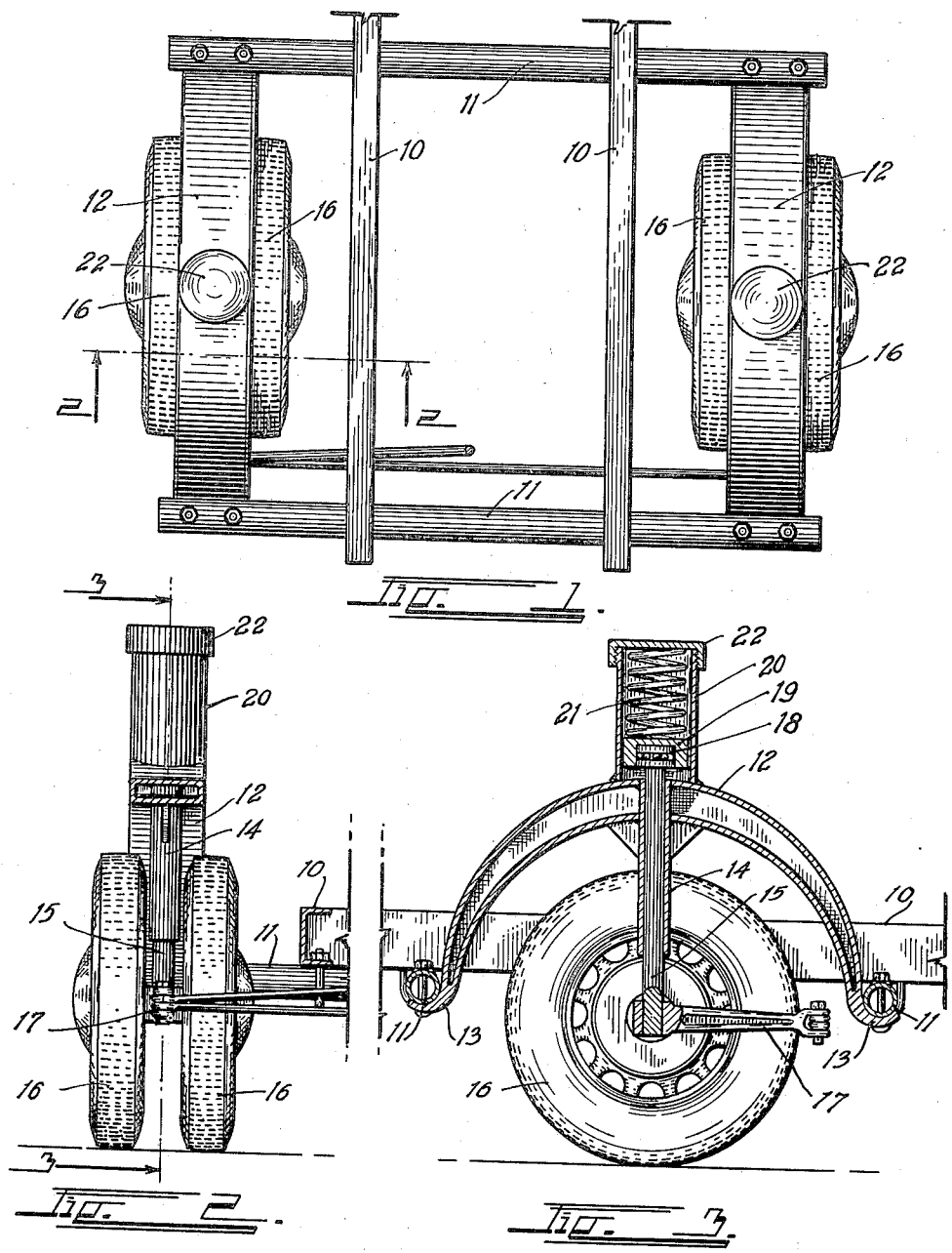

2,247,487

UNITED STATES PATENT OFFICE 2,247,487

DUAL FRONT WHEEL MOUNTING

Edward V. Garnett and Vactor G. Garnett, Denver, Colo.

Application January 15, 1940, Serial No. 313,803

11 Claims. (Cl. 280—96.2)

This invention relates to a dual wheel mounting for trucks, busses and other heavy vehicles and more particularly to a mounting for dual front wheels. In the usual dual wheeled vehicle, the two wheels are mounted on an axle stub extending outwardly from the steering spindle of the truck. This places the entire load to one side of both wheels creating a cantilever effect which places great bending stresses in the axle and results in binding or cramping the steering spindle making steering difficult. It also places the road impacts of both wheels on the same side of the axis of the steering spindle so that they are transmitted to and must be absorbed by the tie rods and steering mechanism resulting in rapid depreciation of the latter.

The principal object of this invention is to provide a dual wheel mounting which will avoid all of the above objectionable features by simply placing the wheels on opposite sides of the axis of the steering spindle so that the load will be balanced between the dual wheels and so that all impacts or road resistances will be counterbalanced by the opposed wheels to relieve the steering mechanism of all unbalanced reactions.

Heretofore, it has been impossible to provide a rigid mounting of this type due to the fact that the placement of the springs required a relatively wide separation of the dual wheels and in order to evenly distribute the load between them, tilting axles must be resorted to. Such axles introduced looseness and wear and resultant "shimmy" which made the high speeds of modern heavy vehicles impossible. Another object of this invention is to remove all springs from between the wheels so that the latter can be placed sufficiently close together to effectively employ a rigid axle construction and still obtain a substantially uniform wheel loading and yet provide a spring support which will not interfere in any way with the full use of the deck space of the vehicle.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the forward portion of a truck or bus chassis illustrating the improved wheel suspension in place thereon.

Fig. 2 is a fragmentary cross section, taken on the line 2—2, Fig. 1.

Fig. 3 is a vertical longitudinal section, taken on the line 3—3, Fig. 2.

Fig. 4 is a plan view of the forward portion of a truck chassis illustrating an alternate form of the suspension thereon.

Fig. 5 is a longitudinal section through the alternate form, taken on the line 5—5, Fig. 4, with the near dual wheels removed.

In the drawings, the longitudinal beam members of a typical vehicle chassis, such as a bus or truck, are indicated at 10.

To apply the improved wheel mounting, a pair of laterally extending, preferably tubular, beams 11 are positioned beneath the chassis members 10 and extend outward beyond both sides thereof. An arcuate arch beam 12 is secured to and extends upward between the projecting ends of the beams 11. The arch beams may be of any desired construction. Hollow, welded beam structures, such as illustrated, have been found to be satisfactory. The lower extremities of the arch beams terminate in hooks 13 in which the lateral beams 11 rest and are secured by means of suitable bolts or welds.

A pivot guide sleeve 14 extends vertically downward from the apex of each arch beam to receive a wheel post 15. The lower extremities of the wheel posts 15 are T-shaped, that is, a rigid axle member extends oppositely outward from each side thereof to support the members of a pair of dual wheels 16. A steering arm 17 extending forwardly therefrom guides the wheels 16.

The posts 15 extend upwardly through the arch beams 12 and terminate in suitable thrust bearings 18 which transmit the pressure of the posts to a spring plate 19. A spring enclosing sleeve 20 surrounds the spring plate 19 and encloses a suitable compression spring 21. The spring 21 is compressed between the spring plate 19 and a cap 22 on the spring sleeve 20.

It can readily be seen that the load on the chassis is cushioned by the springs 21 and that this entire load is concentrated at a point midway between the dual wheels 16. If the spring suspension were placed between the two wheels 16, it would necessitate spreading these wheels apart sufficiently to clear the spring structure. This would place the wheels so far part that one of the wheels would carry more weight than the other on crowned or irregular roads, and would result in strains and stresses in the wheels, the steering posts, and the steering mechanism. By placing the springs above the wheels, however, the latter can be brought so close together that any irregularities in the road will be absorbed by the tires and by the natural resiliency of the metal structure without producing damaging strains or stresses.

It will also be noted that there is no interference with the load space on the chassis since there are no members extending across the latter above the floor. The arch beams are sufficiently high to allow ample vertical movement of the wheels without interference.

In Figs. 4 and 5, an alternate form of construction having the same advantages is illustrated. In this form two arch beams 23 are employed which are welded or otherwise secured to the extremities of laterally extending tubes 24.

A guide tube 25 extends vertically downward from the apex of each of the arch beams to receive a steering post 26. The steering posts 26 ride against thrust bearings 27 in the tubes. The lower extremity of each post is provided with oppositely extending axle studs on each of which a dual wheel 28 is journalled. A steering arm 29 extends forwardly from each post to which a steering tie rod 20 and the steering mechanism is connected.

The laterally extending tubes in this form are cushioned at each side of the chassis upon a pair of leaf springs 31. Each of the tubes 24 is secured to the mid portion of its springs 31 by means of suitable clamps 32. One extremity of each spring is pivotally mounted on a fixed spring bracket 33 on the chassis 10. The other extremity of each spring is suspended from the chassis in hinged spring shackles 34.

It can be readily seen that downward movement of the chassis 10 is resiliently transmitted to the tubes 24 by the springs 31 and is transmitted from the tubes through the arch beams 23, the thrust bearings 27, and the steering posts 26 to the wheels 28.

This form has all of the advantages of the previously described form but eliminates the necessity of placing the springs on the arch beams and employs leaf springs below the chassis in their stead.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for mounting steerable dual wheels on a truck chassis comprising: a pair of parallel beams extending laterally of said chassis and projecting therebeyond at each side thereof; an upwardly arched beam at each side of said chassis secured between the projecting lateral beams; a guide sleeve extending vertically downward from the apex of each arch beam; a steering post rotatably mounted in each guide sleeve; axle studs extending oppositely outward from each side of said steering posts; wheels mounted on said axle studs; and means for rotating said steering posts in said guide sleeves.

2. Means for mounting steerable dual wheels on a truck chassis comprising: a pair of parallel beams extending laterally of said chassis and projecting therebeyond at each side thereof; an upwardly arched beam at each side of said chassis secured between the projecting lateral beams; a guide sleeve extending vertically downward from the apex of each arch beam; a steering post rotatably mounted in each guide sleeve; axle studs extending oppositely outward from each side of said steering posts; wheels mounted on said axle studs; means for rotating said steering posts in said guide sleeves; and spring means positioned in the load path between said chassis and said steering posts.

3. Means for mounting steerable dual wheels on a truck chassis comprising: a pair of parallel beams extending laterally of said chassis and projecting therebeyond at each side thereof; an upwardly arched beam at each side of said chassis secured between the projecting lateral beams; a guide sleeve extending vertically downward from the apex of each arch beam; a steering post rotatably mounted in each guide sleeve; axle studs extending oppositely outward from each side of said steering posts; wheels mounted on said axle studs; means for rotating said steering posts in said guide sleeves; and spring means positioned between said lateral beams and said chassis.

4. A steerable dual wheel mounting for vehicles comprising: a pair of parallel laterally extending beams; an arch beam secured between the extremities of the lateral beams at each extremity thereof; a guide sleeve extending downward from the apex of each arch beam; a steering post rotatably mounted in each guide sleeve; wheel axles extending oppositely outward from each side of each steering post; and a wheel mounted on each wheel axle so that each of said steering posts will extend downwardly between a pair of said wheels.

5. A steerable dual wheel mounting for vehicles comprising: a pair of parallel laterally extending beams; an arch beam secured between the extremities of the lateral beams at each extremity thereof; a guide sleeve extending downward from the apex of each arch beam; a steering post rotatably mounted in each guide sleeve; wheel axles extending oppositely outward from each side of each steering post; a wheel mounted on each wheel axle so that each of said steering posts will extend downwardly between a pair of said wheels; and spring means acting to cushion the downward movement of said arch beams on said steering posts.

6. A steerable dual wheel mounting for vehicles comprising: a pair of parallel laterally extending beams; an arch beam secured between the extremities of the lateral beams at each extremity thereof; a guide sleeve extending downward from the apex of each arch beam; a steering post rotatably mounted in each guide sleeve; wheel axles extending oppositely outward from each side of each steering post; a wheel mounted on each wheel axle so that each of said steering posts will extend downwardly between a pair of said wheels; a spring supporting member on each arch beam; and a spring in each supporting member, said steering posts extending upwardly through said arch beams to support said springs.

7. A dual wheel mounting for vehicles comprising: a pair of oppositely extending axle studs; a wheel mounted on each stud; a post extending upwardly from said studs between said wheels; a guide sleeve surrounding said post; a longitudinally extending beam secured to each guide sleeve and extending longitudinally of said vehicle; a pair of lateral beams extending across said vehicle between the extremities of the longitudinal beams; and spring means supporting said vehicle from each of said lateral beams.

8. A dual wheel mounting for vehicles comprising: a pair of oppositely extending axle studs; a wheel mounted on each stud; a post extending upwardly from said studs between said wheels; a guide sleeve surrounding said post; a longitudinally extending beam secured to each guide sleeve and extending longitudinally of said vehicle; a pair of lateral beams extending across said vehicle between the extremities of the longitudinal beams; means for securing said lateral beams to said vehicle; a spring holder above each of said longitudinally extending beams, said posts extending upwardly through said beams into said spring holder; and a compression spring cushioning the upward movement of said posts.

9. Means for mounting steerable dual wheels on a truck chassis comprising: a pair of supporting members projecting outwardly at each side of said chassis; an arched beam extending between the projecting members at each side of said chassis; a telescoping member extending vertically downward from said arched beam, the lower portion of said telescoping member being rotatable with reference to the upper portion thereof; a wheel rotatably mounted on each side of the lower portion of each telescoping member; and means for rotating said lower portion for steering purposes.

10. Means for mounting steerable dual wheels on a truck chassis comprising: a pair of supporting members projecting outwardly at each side of said chassis; an arched beam extending between the projecting members at each side of said chassis; a telescoping member extending vertically downward from said arched beam; and a wheel rotatably mounted on each side of the lower portion of each telescoping member.

11. Means for mounting steerable dual wheels on a truck chassis comprising: a pair of supporting members projecting outwardly at each side of said chassis; an arched beam extending between the projecting members at each side of said chassis; a telescoping member extending vertically downward from said arched beam; a wheel rotatably mounted on each side of the lower portion of each telescoping member; and spring means positioned in the load path between said chassis and the lower portion of said telescoping member.

EDWARD V. GARNETT.
VACTOR G. GARNETT.